(12) United States Patent
Gattone

(10) Patent No.: US 6,783,314 B2 
(45) Date of Patent: Aug. 31, 2004

(54) FASTENER DEVICE

(75) Inventor: Michael T. Gattone, Tinley Park, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/359,816

(22) Filed: Feb. 6, 2003

(65) Prior Publication Data

US 2003/0147724 A1 Aug. 7, 2003

Related U.S. Application Data

(60) Provisional application No. 60/355,475, filed on Feb. 7, 2002.

(51) Int. Cl.$^7$ .......................... F16B 21/00; F16B 43/00
(52) U.S. Cl. ........................ 411/533; 411/339; 411/526
(58) Field of Search ................................ 411/338, 339, 411/437, 525, 526, 527, 533; 362/507, 523, 529

(56) References Cited

U.S. PATENT DOCUMENTS

| | | | |
|---|---|---|---|
| 3,027,609 A | * | 4/1962 | Parkin et al. ............ 411/526 X |
| 4,612,501 A | * | 9/1986 | Costello ................. 411/525 X |
| 4,911,594 A | | 3/1990 | Fisher ...................... 411/437 |
| 5,613,819 A | * | 3/1997 | Wehren .................. 411/525 X |
| 5,803,692 A | | 9/1998 | Postadan .................... 411/526 |
| 5,897,281 A | | 4/1999 | Haga et al. ................. 411/525 |
| 6,113,301 A | | 9/2000 | Burton ....................... 403/122 |
| 6,368,039 B2 | * | 4/2002 | Wolfe et al. ................ 411/526 |
| 6,379,093 B1 | * | 4/2002 | Bondarowicz et al. .. 411/525 X |

OTHER PUBLICATIONS

Palnut Fasteners, Detailed Product Information, Copyright C 1997 The Palnut Company.

* cited by examiner

*Primary Examiner*—Neill Wilson
(74) *Attorney, Agent, or Firm*—Mark W. Croll; Paul F. Donovan

(57) ABSTRACT

A fastener device is disclosed for fastening a member having a post extending therefrom to a retainer defining an aperture. The arrangement is such that the post is received within the aperture of the retainer for lockably retaining the member relative to the retainer. The device includes a washer which has a peripheral rim and a first and a second face. The washer defines a hole for the reception therein of the post. The washer has a plurality of barbs which surround the hole, the barbs lockably cooperating with the post when the post is inserted into the hole. Also, the washer defines a plurality of ears which extend from the peripheral rim such that when the post is inserted into the aperture of the retainer, the ears engage the retainer for retaining the member relative to the retainer.

20 Claims, 5 Drawing Sheets

FASTENER DEVICE

CROSS REFERENCE TO RELATED APPLICATIONS

This application claims the benefit of U.S. Provisional Patent Application No. 60/355,475 filed on Feb. 7, 2002. All of the disclosure of the aforementioned application is incorporated herein by reference.

FIELD OF THE INVENTION

The present invention relates to a fastener device which includes a member and a post extending therefrom which cooperates with a retainer. More specifically, the present invention relates to a fastener device which includes a member and a post extending therefrom, a washer secured to the post and an associated structure adapted to receive the post and washer.

BACKGROUND OF THE INVENTION

Push-in fastener assemblies are used for many applications including, for example, retaining in position a headlamp assembly for an automobile or the like.

U.S. patent application Ser. No. 09/728,400 filed Dec. 1, 2000 (now U.S. Pat. No. 6,361,261) and Ser. No. 09/998,065 filed Nov. 30, 2001 exemplify the particular application to which the present invention relates. All of the disclosure of the aforementioned patent and patent applications are incorporated herein by reference into the subject application.

A fastener device assembly according to the present invention includes a post which extends from a member. A washer is mounted on the post. The washer engages an internal surface of a retainer when the post is inserted into an aperture defined by the retainer. The arrangement is such that undesirable removal of the post from the aperture is prevented.

Usually, the post is fabricated from plastics material and the washer includes outwardly extending ears or tabs or fingers for engaging an internal wall of the retainer. In certain aspects, the fastener device according to the present invention bears a resemblance to the washer disclosed in U.S. Pat. No. 4,911,594 to Fisher. However, the ears of the fastener according to the present invention permit retention of the assembly relative to the retainer. In one application of the present invention, the retainer is a molded structure found in a headlamp housing or a headlamp reflector. When the angled ears or fingers of the fastener device according to the present invention are deflected inwardly towards the post during assembly thereof, the ears interfere with the inner wall of the retainer to provide a resistance to any tendency for the post to pull-out of the aperture. The deflection of the ears generates an appreciable amount of tension or friction or force between the outer diameter of the washer and the inner diameter of the retainer. Such frictional force must be overcome before the assembly can be pulled out of the aperture of the retainer.

A feature of the present invention is the provision of a plurality of barbs which engage the post for locking the post within the hole of the washer. A problem with known washers is that they have a tendency to rotate during vibration. More particularly, if a washer rotates during vibration such as during road vibration, the subassembly of the washer and post can be easily pulled out of the mating retainer. The arrangement according to the present invention inhibits rotation of the fastener relative to the post thus decreasing the likelihood of the post becoming detached from the retainer.

Although the present invention finds particular application with regard to automobile headlamp assemblies, such as disclosed in FIG. 17 of U.S. Pat. No. 6,113,301 to Burton, it is to be understood that the invention according to the present application is not limited to such usage.

Therefore, it is a feature of the present invention to provide a fastener device that overcomes the problems associated with the prior art arrangements.

Another feature of the present invention is the provision of a fastener device that is reliable in use and that is relatively low in cost.

Yet another feature of the present invention is the provision of a fastener device which includes a member and a post extending therefrom, a washer which cooperates with the post and a retainer defining an aperture so that when the post is inserted into the aperture, the member and the retainer are locked together.

Still another feature of the present invention is to provide an anti-pull out and an anti-rotation push-in fastener assembly.

Other features and advantages of the present invention will become apparent to those skilled in the art upon review of the following detailed description, claims and drawings in which like numerals are used to designate like features.

SUMMARY OF THE INVENTION

The present invention relates to a fastener device which includes a member having a post extending therefrom. The arrangement is such that when the device is assembled, the post is retainably inserted into an aperture defined by an associated structure. The fastener device also includes a washer which has a peripheral rim and a first and a second face. The washer defines a hole for the reception therein of the post. The washer has a plurality of barbs which surround the hole, the barbs lockably cooperating with the post when the post is inserted into the hole of the washer. Also, the washer further defines a plurality of ears which extend from the peripheral rim such that when the post is inserted into the aperture of the associated structure, the ears engage the inner wall of the associated structure for securing the member and the associated structure relative to each other.

In another aspect of the present invention, a fastener device includes a member having a post extending therefrom. A retainer defines an aperture for receiving therein the post and a washer has a peripheral rim and a first and a second face, the washer defining a hole for the reception therein of the post. The washer includes a plurality of barbs which surround the hole, the barbs cooperating with the post when the post is inserted into the hole so that the washer remains secured to the post. Also, the washer defines a plurality of ears which extend from the peripheral rim such that when the post is inserted into the aperture of the retainer, the ears engage the retainer for retaining the member and the retainer relative to each other.

In yet another aspect of the present invention, a fastener device is provided for lockably securing a headlamp assembly. The fastener device includes a member which is secured to the headlamp assembly, the member having a post extending therefrom. A retainer defines an aperture for receiving the post therein. Also, a washer has a peripheral rim and a first and a second face, the washer defining a hole for the reception therein of the post. The washer defines a plurality of barbs which surround the hole, the barbs cooperating with the post when the post is inserted into the hole so that the washer remains secured to the post. Furthermore, the washer defines a plurality of ears which extend from the peripheral rim such that when the post is inserted into the aperture of the retainer, the ears engage the retainer for retaining the member and the retainer relative to each other.

Figure 1:
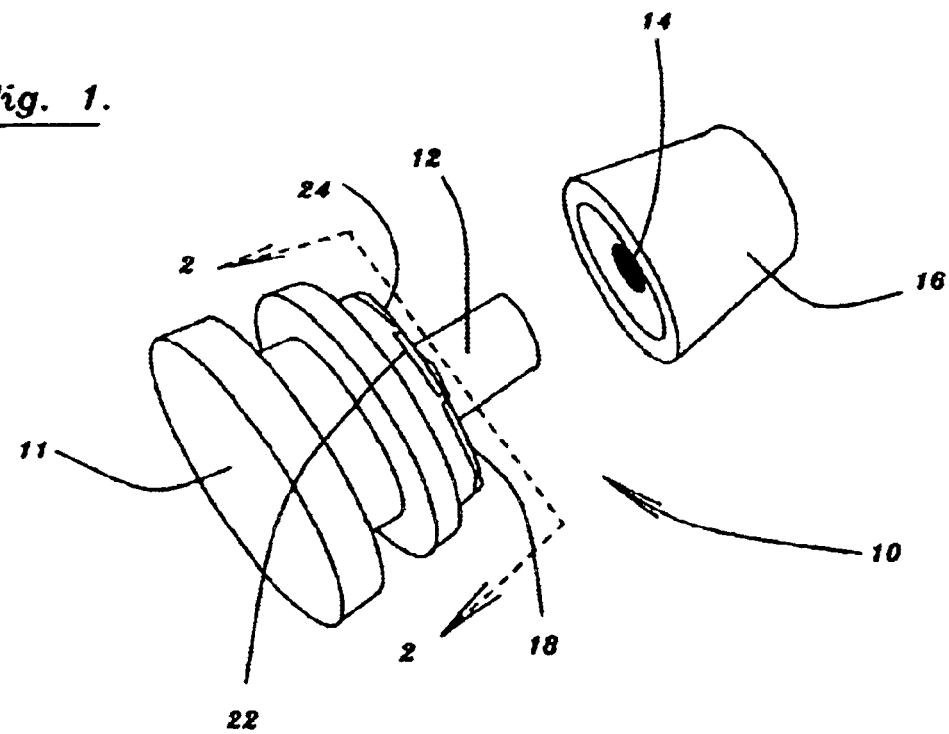
FIG. 1 is a perspective view of a fastener device assembly according to the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

FIG. 1 is a perspective view of a fastener assembly generally designated 10 according to the present invention. As shown in FIG. 1, the assembly 10 includes a member 11 having a post 12 extending therefrom such that when the assembly 10 is assembled, the post 12 is retainably inserted into an aperture 14 defined by a retainer 16.

Figure 2:
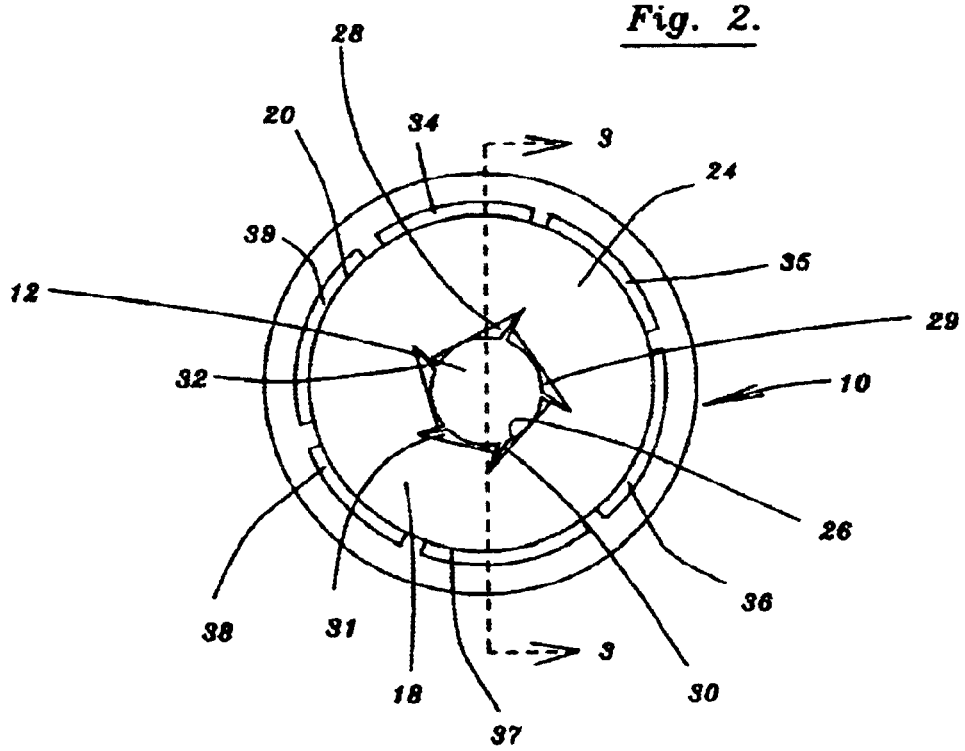
FIG. 2 is a view taken on the line 2—2 of FIG. 1.

FIG. 2 is a view taken on the line 2—2 of FIG. 1. As shown in FIG. 2, the assembly 10 includes a fastener device or washer 18 which has a peripheral rim 20 and a first face 22.

Figure 3:
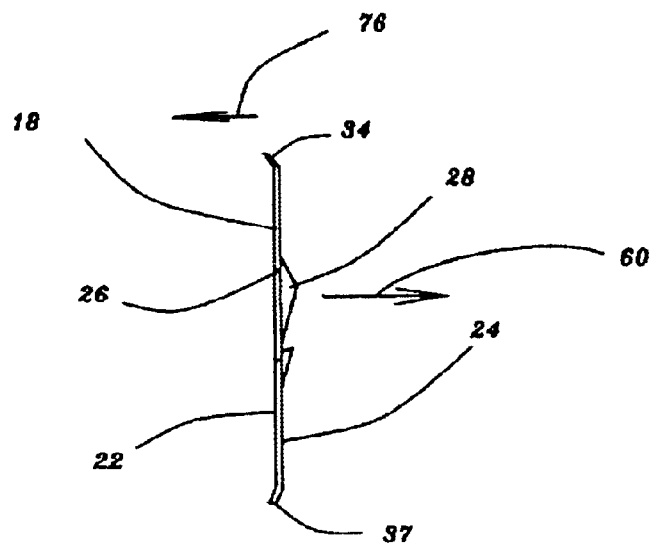
FIG. 3 is a sectional view of the washer shown in FIGS. 1 and 2 taken on the line 3—3 of FIG. 2.

FIG. 3 is a sectional view of the washer 18 shown in FIGS. 1 and 2 taken on the line 3—3 of FIG. 2. As shown in FIG. 3, the washer 18 has a second face 24. As shown in FIG. 2, the washer 18 defines a hole 26 for the reception therein of the post 12. The washer 18 has a plurality of barbs 28, 29, 30, 31 and 32 which surround the hole 26. The barbs 28–32 cooperate with the post 12 when the post 12 is inserted into the hole 26 so as to secure the washer 18 to the post 12. Also, the washer 18 further defines a plurality of ears 34, 35, 36, 37, 38 and 39 which extend from the peripheral rim 20 such that when the post 12 is inserted into the aperture 14 of the retainer 16, the ears 34–39 engage an inner surface of the retainer 16 for retaining the member 11 and the post 12 extending therefrom relative to the retainer 16. It should be noted that the spacing between the ears, the angle of the ears, the number of ears, and the overall size of the ears can be modified to achieve optimal performance when considering different materials and aperture sizes.

In a more specific embodiment of the present invention, the washer 18 is metallic and the washer 18 is stamped from a metallic sheet. In a preferred embodiment of the present invention, the washer 18 is fabricated from springy steel. Moreover, the washer 18 is of circular configuration, the hole 26 being concentric relative to the peripheral rim 20. Also, each barb of the plurality of barbs 28–32 is of generally triangular shaped configuration.

Figure 4:
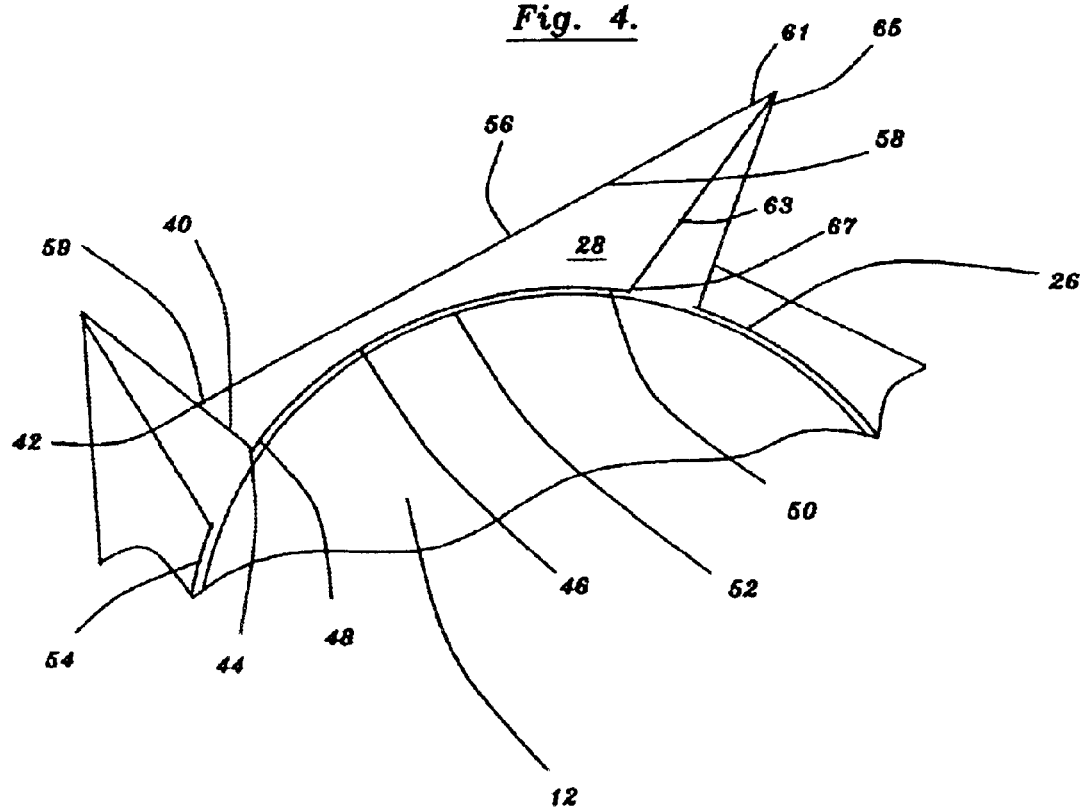
FIG. 4 is an enlarged view of one of the barbs shown in FIG. 2.

FIG. 4 is an enlarged view of one of the barbs 28. As shown in FIG. 4, the barb 28 includes a first side 40 having a first and a second end 42 and 44 respectively. The first side 40 is disposed radially relative to the hole 26. A second side 46 has a first and a second extremity 48 and 50 respectively, the second side 46 being a portion 52 of a periphery 54 of the hole 26. The first extremity 48 of the second side 46 extends from the second end 44 of the first side 40. Also, a third side 56 is a crease 58 having a first and a second border 59 and 61 respectively. The first border 59 of the crease 58 extends from the first end 42 of the first side 40. Also, a fourth side 63 has a proximal and a distal end 65 and 67 respectively. The proximal end 65 extends from the second border 61 of the third side 56. Additionally, the distal end 67 of the fourth side 63 extends from the second extremity 50 of the second side 46. Each barb of the plurality of barbs 28–32 is uniformly inclined relative to the hole 26. As shown in FIG. 3, each barb of the plurality of barbs 28–32 extends in a direction as indicated by the arrow 60, axially away from the hole 26. Each of the second sides such as the side 46 of the barbs 28–32 cooperates with the post 12 for securing the washer 18 to the post 12 when the post 12 is inserted into the hole 26.

Although not clearly shown, prior to assembly, it should be understood that the hole 26 is slightly smaller than the outer diameter of the post 12. As the post 12 is received by the hole 26 of the washer 18, the barbs 28–32 are configured in such a manner to allow the hole 26 to expand to receive the post. As can be observed, the inner diameter of the washer 18 is at least partially defined by a scalloped surface. The barbs 28–32 are adapted to engage or even dig into the outer surface of the post 12 to ensure that the washer 18 remains on the post 12. Although a specific structure for the barbs 28–32 has been described, alternative constructions consistent with the principles of the present invention would be satisfactory.

As mentioned, a feature of the present invention concerns the scalloped inner surface of the washer 18. A problem with known washers is that they have a tendency to rotate during vibration. In other words, if a washer rotates during vibration (such as during operation of an automobile), the subassembly can be undesirably easily pulled out of the mating boss. Thus, the present invention solves this noted problem and other problems by providing a design that resists rotation, particularly when subject to vibration. The scalloped inner surface of the washer 18 interacts with the mating surface of the post 12 to prevent the washer from rotating.

Figure 5:
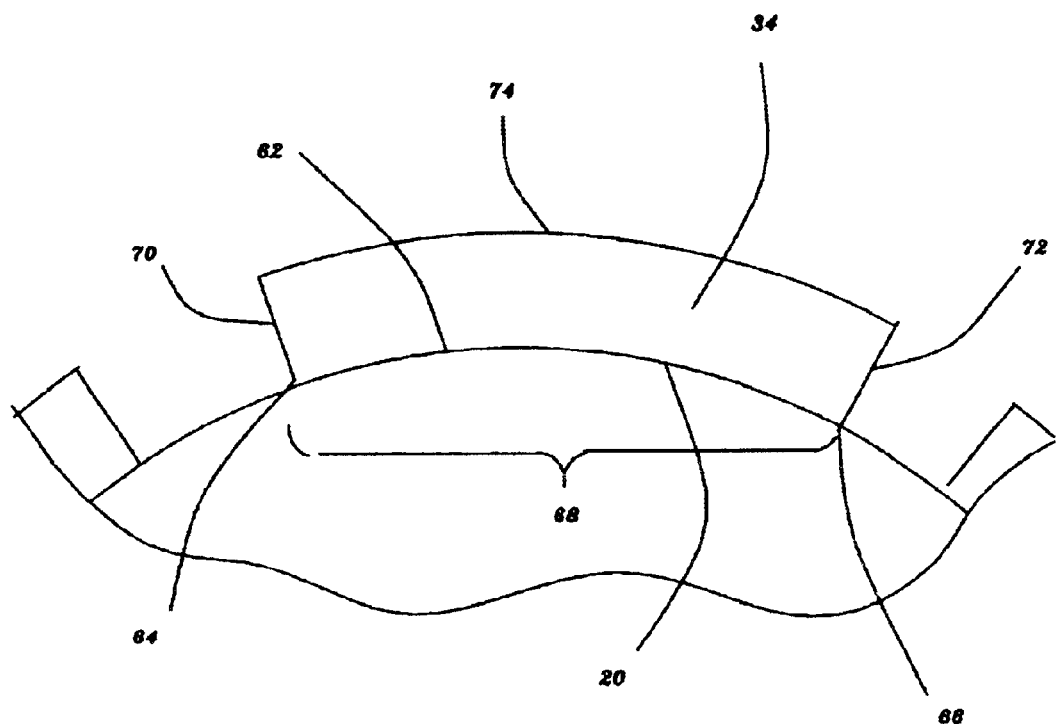
FIG. 5 is an enlarged view of one of the ears shown in FIG. 2.
Figure 6:
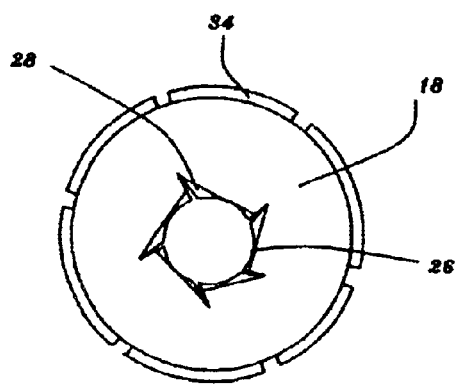
FIG. 6 is a view of the washer viewed from the opposite side to that which is shown in FIG. 2.

FIG. 5 is an enlarged view of the ear 34 of the plurality of ears 34–39. As shown in FIG. 5, the ear 34 includes a first edge 62 having a first and a second termination 64 and 66 respectively, the first edge 62 being a portion 68 of the rim 20. Also, a first and second radial edge 70 and 72 respectively extend respectively from the first and the second termination 64 and 66. An outer edge 74 extends from the first radial edge 70 to the second radial edge 72. Additionally, as shown in FIG. 3, each ear of the plurality of ears 34–39 extends axially in a further direction as indicated by the arrow 76, the further direction 76 being opposite to the direction 60. FIG. 6 is a view of the washer 18 viewed in the direction 60 shown in FIG. 3.

Figure 7:
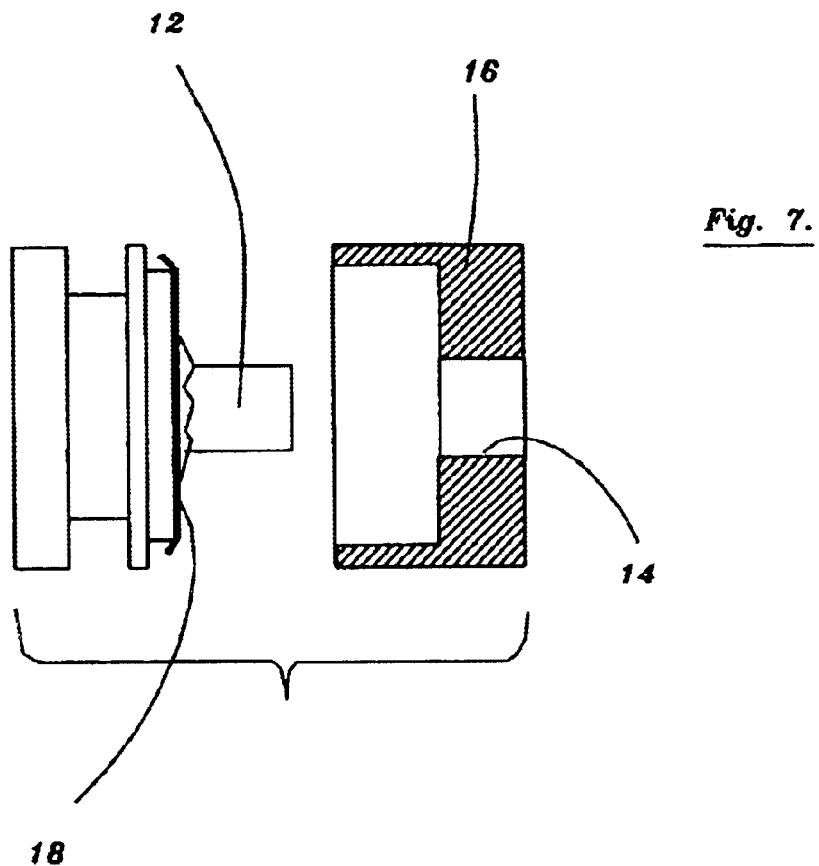
FIG. 7 is a side elevational view partially in section of the unassembed device shown in FIG. 1.
Figure 8:
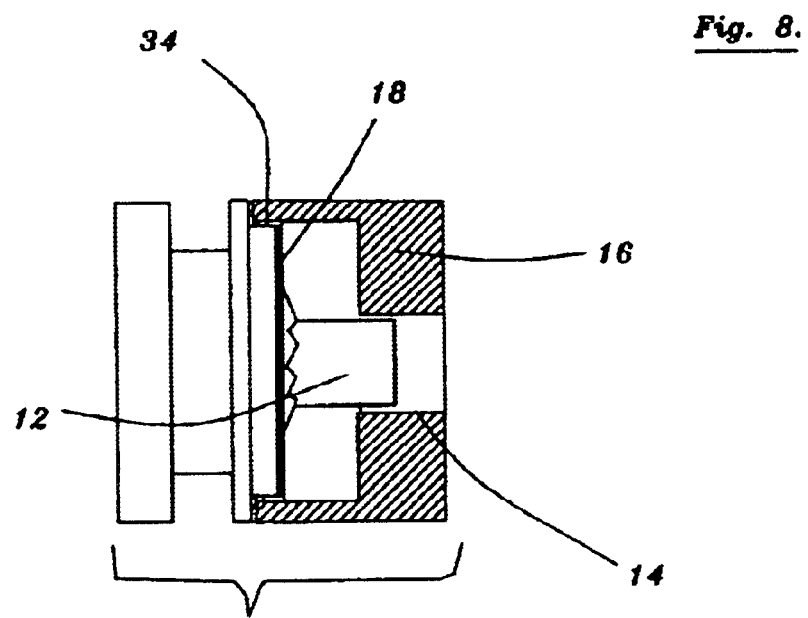
FIG. 8 is a view which is similar to that shown in FIG. 7 but with the device assembled.

FIG. 7 is a side elevational view partially in section of the unassembed assembly 10. As shown in FIG. 7, the post 12 is inserted into the hole 26 of the washer 18. FIG. 8 is a view which is similar to that shown in FIG. 7 but with the assembly 10 assembled. As shown in FIG. 8, the post 12 is inserted into the aperture 14 of the retainer 16 and the cars 34–39 engage an internal wall 80 of the retainer 16 so that the member 11 and the retainer 16 are secured relative to each other. When pushing the subassembly into the boss or retainer 16, the angled fingers 34–39 on the washer deflect inwards towards the post 12. The fingers 34–39 of the washer 18 interfere with the inner surface 80 of the blind hole aperture 14 to provide a resistance to pull-out. The deflection of the fingers 34–39 creates an appreciable amount of tension or friction or force between the outer diameter of the washer 18 and the inner diameter of the blind aperture hole. This tension or force or friction must be overcome before the subassembly can be pulled out of the blind hole aperture.

Figure 9:
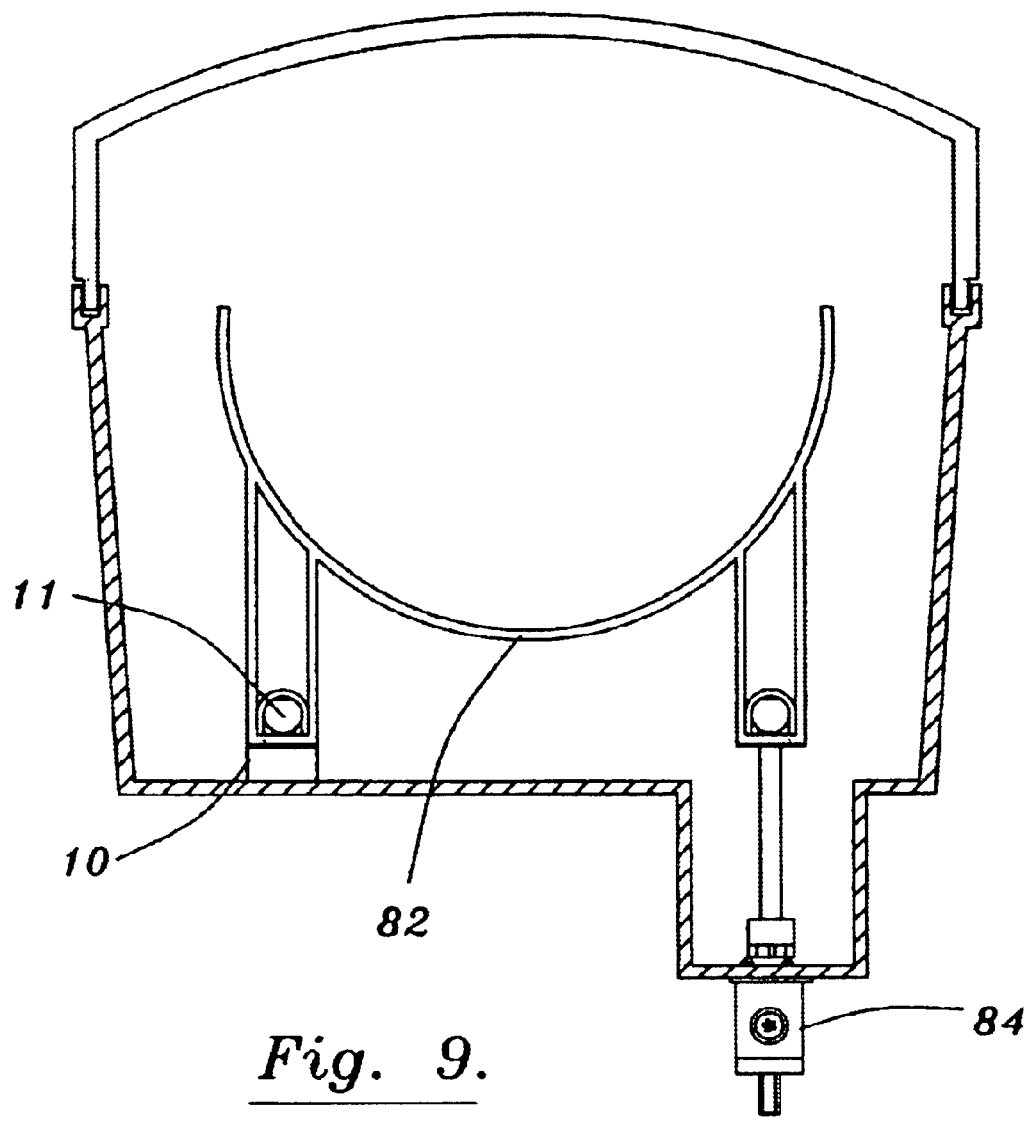
FIG. 9 is a side elevational view of the fastener device according to the present invention incorporated into a headlamp housing.

FIG. 9 is a side elevational view of a fastener assembly device 10 according to the present invention applied to a headlamp reflector 82. As shown in FIG. 9, when the member 11 and the retainer 16 (see FIG. 1) are lockably secured relative to each other, adjustment of the elevation of the headlamp reflector 82 by an adjusting device 84 is permitted. As shown in FIG. 9 and as generally known, the member 11 may include a round head instead of a flat head as shown in FIG. 1 to allow for the adjustment of the headlamp reflector 82.

In sum, in operation of the fastener device assembly 10 according to the present invention, the post 12 is inserted through the hole 26 of the washer 18. The barbs 28–32 secure the washer 18 to the post 12 and prevent rotation of the washer 18 about the post 12. The subassembly of the member 11, post 12 and washer 18 is then lockably secured to the retainer 16 by inserting the post 12 within the aperture 14 of the retainer 16 so that the ears 34–39 engage the internal wall 80 of the retainer 16.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener device for fastening a member having a post extending therefrom to a retainer defining an aperture, said device comprising:
    a washer having a peripheral rim and a first and a second face, said washer including a hole for the reception therein of the post, said hole being originally smaller than an outer diameter of the post, said washer further including a plurality of barbs which surround said hole, said barbs being configured to cooperate with the post when the post is inserted into said hole of said washer so as to secure said washer to the post, said barbs being adapted to allow said hole to increase in size to receive the post as the post is pushed through said hole, and said washer further including a plurality of ears extending from said peripheral rim such that when the post is inserted into the aperture of the retainer, said ears engage an inner surface of the retainer for securing the member and the retainer relative to each other, wherein each ear of said plurality of ears includes a first edge having a first and a second termination, said first edge being a portion of said rim, a first and second radial edge extending respectively from said first and said second termination, and an outer edge extending from said first radial edge to said second radial edge.

2. A fastener device as set forth in claim 1, wherein said washer is metallic.

3. A fastener device as set forth in claim 1, wherein said washer is stamped from a metallic sheet.

4. A fastener device as set forth in claim 1, wherein said washer is of a generally circular configuration, said hole being concentric relative to said peripheral rim.

5. A fastener device as set forth in claim 1, wherein each barb of said plurality of barbs is of generally triangular shaped configuration.

6. A fastener device as set forth in claim 5, wherein each barb includes a first side having a first and a second end, said first side being disposed radially relative to said hole, a second side having a first and a second extremity, said second side being a portion of an outer periphery of said hole, said first extremity of said second side extending from said second end of said first side, and a third side which is a crease, said crease extending from said first end of said first side.

7. A fastener device as set forth in claim 6, wherein each barb of said plurality of barbs is uniformly inclined relative to said hole.

8. A fastener device as set forth in claim 7, wherein each side of said second sides of said barbs cooperates with the post for retaining the post within said hole when the post is inserted into said hole.

9. A fastener device as set forth in claim 8, wherein each barb of said plurality of barbs extends in a direction axially away from said hole.

10. A fastener device as set forth in claim 1, wherein each ear of said plurality of ears extends axially in a direction away from said hole in relation to the post.

11. A fastener assembly comprising:
    a member having a post extending therefrom;
    a retainer defining an aperture for receiving therein said post, said retainer including an inner surface; and
    a washer having a peripheral rim and a first and a second face, said washer defining a hole for the reception therein of said post, said washer defining a plurality of barbs which surround said hole, said hole being at least partially defined by said barbs and a scalloped surface, said barbs and said scalloped surface cooperating with said post when said post is inserted into said hole so as to secure said washer to said post, and said washer further defining a plurality of ears extending from said peripheral rim such that when said post is inserted into said aperture of said retainer, said ears engage said inner surface of said retainer for securing said member and said retainer relative to each other.

12. A fastener device for securing a headlamp assembly, said fastener device comprising:

a member secured to the headlamp assembly, said member having a post extending therefrom;

a retainer defining an aperture for receiving therein said post, and a washer having a peripheral rim and a first and a second face, said washer defining a hole for the reception therein of said post, said washer defining a plurality of barbs which surround said hole, said barbs cooperating with said post when said post is inserted into said hole so as to secure said washer to said post, and said washer further defining a plurality of ears extending from said peripheral rim such that when said post is inserted into said aperture of said retainer, said ears engage said retainer for securing said member and said retainer relative to each other.

13. A fastener device as set forth in claim 12, wherein said washer is of a generally circular configuration, said hole being concentric relative to said peripheral rim, and said hole being originally smaller than an outer diameter of the post, said barbs being adapted to allow said bole to increase in size to receive the post as the post is pushed through said hole, and wherein each ear of said plurality of ears includes a first edge having a first and a second termination, said first edge being a portion of said rim, a first and second radial edge extending respectively from said first and said second termination, and an outer edge extending from said first radial edge to said second radial edge.

14. A fastener device for fastening a member having a post extending therefrom to a retainer defining an aperture, said device comprising:

a washer having a peripheral rim and a first and a second face, said washer including a hole for the reception therein of the post, said washer further including a plurality of barbs which surround said hole, each barb of said plurality of barbs being of a generally triangular shaped configuration, said barbs being configured to cooperate with the post when the post is inserted into said bole of said washer so as to secure said washer to the post, and said washer further including a plurality of ears extending from said peripheral rim such that when the post is inserted into the aperture of the retainer, said ears engage an inner surface of the retainer for securing the member and the retainer relative to each other.

15. A fastener device as set forth in claim 14, wherein each barb includes a first side having a first and a second end, said first side being disposed radially relative to said hole, a second side having a first and a second extremity, said second side being a portion of an outer periphery of said hole, said first extremity of said second side extending from said second end of said first side, and a third side which is a crease, said crease extending from said first end of said first side.

16. A fastener device as set forth in claim 15, wherein each barb of said plurality of barbs is uniformly inclined relative to said hole.

17. A fastener device as set forth in claim 16, wherein each side of said second sides of said barbs cooperates with the post for retaining the post within said hole when the post is inserted into said hole.

18. A fastener device as set forth in claim 17, wherein each barb of said plurality of barbs extends in a direction axially away from said hole.

19. A fastener device as set forth in claim 14, wherein each ear of said plurality of ears includes a first edge having a first and a second termination, said first edge being a portion of said run, a first and second radial edge extending respectively from said first and said second termination, and an outer edge extending from said first radial edge to said second radial edge.

20. A fastener device as set forth in claim 19, wherein each ear of said plurality of cars extends axially in a direction away from said hole in relation to the post.

* * * * *